United States Patent [19]

Gunther

[11] 3,905,958

[45] Sept. 16, 1975

[54] SELENIUM COMPOUNDS

[75] Inventor: Wolfgang H. H. Gunther, Webster, N.Y.

[73] Assignee: Xerox Corporation, Stamford, Conn.

[22] Filed: Dec. 20, 1971

[21] Appl. No.: 210,275

[52] U.S. Cl. ............ 260/239 R; 260/2 M; 260/244; 260/248 R; 260/250 A; 260/250 P; 260/250 Q; 260/250 C; 260/251 Q; 260/251 R; 260/251.5; 260/283 R; 260/286 A; 260/288 P; 260/293.55; 260/309.6; 260/310 R; 260/310 C; 260/313.1; 260/315; 260/319.1; 260/326.32; 260/327 B; 260/327 P; 260/329 F; 260/335; 260/345.1; 260/345.5; 260/346.2

[51] Int. Cl.² ...................................... C07D 345/00

[58] Field of Search ......... 260/239 R, 327 R, 327 B

[56] References Cited
UNITED STATES PATENTS

| | | | |
|---|---|---|---|
| 2,160,915 | 6/1939 | Schreiber | 260/239 R |
| 2,657,198 | 10/1953 | Davis | 260/327 B |
| 3,671,467 | 6/1972 | Gunther | 260/2 M |

OTHER PUBLICATIONS

Gould, et al., J.A.C.S. 78, 5825–5826 (1956), "Some Reactions of 1,4–Diselenane."
Okamoto et al., "Annals N.Y. Acad. of Sciences," Vol. 192, pp. 60–71 (1972).
Keimatsu et al., (An Unidentified Japanese Chemical Publication), pp. 58–67, Received Dec. 20, 1934.

*Primary Examiner*—Donald G. Daus
*Assistant Examiner*—D. B. Springer
*Attorney, Agent, or Firm*—James J. Ralabate; David C. Petre; Raymond C. Loyer

[57] ABSTRACT

This invention relates to organic diselenides and polyselenides among which are cyclic compounds represented by the formula:

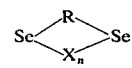

I.

wherein R is selected from divalent hydrocarbylene radicals of 5 to 20 carbon atoms, divalent heterocyclic, alicyclic and aromatic radicals having from 3 to 50 carbon atoms, $n$ is a positive integer and X is the radical — Se — R — Se — ; linear polymers having a repeating unit represented by the formula:

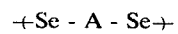

II wherein A is selected from divalent alkylene radicals having from 9 to 20 carbon atoms, divalent aromatic radicals from 6 to 50 carbon atoms and divalent heterocyclic radicals.

15 Claims, No Drawings

SELENIUM COMPOUNDS

BACKGROUND OF THE INVENTION

This invention relates to metallo organic compounds and more particularly to seleno organic compounds, their preparation and use in electrophotographic plates.

There have been known various methods for the production of images, such as photography, offset lithography, xerography, and the like. In xerography, as disclosed by C. F. Carlson in U.S. Pat. No. 2,297,691, a base plate of relatively low electrical resistance, such as metal, paper, etc., having a photoconductive insulating surface coated thereon, is electrostatically charged in the dark. The charged coating is then exposed to a light image. The charges leak off rapidly to the base plate in proportion to the intensity of light to which any given area is exposed. The charge is substantially retained in the non-exposed areas. After such exposure, the coating is contacted with electroscopic marking particles in the dark. These particles adhere to the areas where the electrostatic charges remain, forming a powder image corresponding to the electrostatic image. This method is further disclosed in U.S. Pat. Nos. 2,659,670, 2,753,308 and 2,788,288. The powder image can be transferred to a sheet of transfer material resulting in a positive or negative print as the case may be. Alternatively, where the base plate is relatively inexpensive, it may be desirable to fix the powder image directly to the plate itself. A full description of the xerographic process may be found in a book by Dessauer and Clark, entitled "Xerography and Related Processes" (Focal Press Limited, 1965).

As disclosed in the above-noted Carlson patent, suitable inorganic and organic materials may be used to form the photoconductive insulating layer on which the latent electrostatic image is formed. While many photoconductors have been used or attempted, selenium has been the most commercially accepted material for use in electrophotographic plates.

The discovery of the photoconductive insulating properties of vitreous selenium has resulted in this material becoming the standard in commercial xerography. Its photographic speed is many times that of the prior art photoconductive materials and plates employing this material are characterized by being capable of receiving a satisfactory electrostatic charge and selectively dissipating such a charge when exposed to a light pattern.

Although selenium is the most desirable photoconductor known today for use in electrophotography, it has been found that electrophotographic plates employing selenium-containing photoconductive layers often suffer from problems due to poor adhesion between the photoconductive layer and the underlying substrate. Differences in thermal expansion between the substrate and the photoconductive layer may cause cracking and a subsequent peeling of the photoconductive layer from said substrate material. The electrophotographic plate in a commercial machine is subjected to a substantial temperature difference between cool periods when out of use and unavoidable heating due to the close proximity of thermofusing means during the copying cycle. This heating causes thermal expansion of the substrate and photoconductive materials, which in turn, leads to the cracking and peeling discussed above and such faults will appear as defects in the copy.

In commercial applications, selenium has generally been deposited upon a rigid backing material, such as rigid cylindrical drum. However, in order to increase the speed of commercial electrophotographic machines, it has been proposed to utilize a flexible belt, such as the one shown in U.S. Pat. No. 3,146,688, as the supporting substrate for the deposited photoconductive insulator. Such a system offers a substantially increased reproduction surface thereby permitting increased speed in the reproduction of copies from an original.

Problems of adhesion and brittleness become much greater where the photoconductive layer is coated on a flexible belt substrate which is entrained around pulleys since continuous flexing of the photoconductive layer often leads to cracking, spalling and a separation from said substrate during the fast belt cycling operation. Where a barrier layer is interposed between the photoconductive layer and the underlying substrate, additional problems may result since this interlayer must adhere well to said substrate as well as to the seleniumcontaining overlayer, under flexing stress. Selection of an interlayer material which has good adhesion properties is limited by the requirement that said interlayer not affect the accepted xerographic properties of the photoreceptor. The seleno organic compounds of this invention have been found to be particularly useful as interlayer material on rigid and flexible substrates.

Although selenium has become widely used as the photoconductive material in electrophotographic plates, many special conditions and precautions must be taken into consideration if the material is to perform at its maximum capability and efficiency. For example, the selenium employed must be extremely pure since certain impurities change drastically the photoconductive properties of the metal. The electrophotographic plates are usually prepared by condensing selenium vapor on the substrate, a technique which requires exacting conditions. Special handling of the plates is required so as to prevent the conditions conductive to crystallization of the selenium. For instance, a single fingerprint from handling the plate may induce crystallization of the selenium touched thus adversely affecting the photoconductivity of the plate in that area.

For many purposes the photoconductivity of the photoconductor employed in the plate is desirably modified. The photoconductivity of selenium can be modified by its combination with other metals such as arsenic. Such modification requires precise control over the preparation of the material.

Certain compounds of this invention are not only useful as interlayer material in selenium plates but also possess photoconductive properties. Thus, electrophotographic plates can be prepared employing certain compounds of this invention as the photoconductor.

SUMMARY OF THE INVENTION

It is, therefore, an object of this invention to provide novel metallo organic compounds.

Another object of this invention is to provide electrophotographic plates which overcome the above noted disadvantages.

Another object of this invention is to provide novel photoconductive materials.

Another object of this invention is to provide an electrophotographic plate having improved adhesion between the photoconductive layer and the underlying substrate.

It is still another object of this invention to provide an electrophotographic plate having enhanced physical and mechanical properties.

It is yet another object of this invention to provide a flexible photoreceptor which does not crack, flake or spall during fast belt operation.

It is still another object of this invention to provide an electrophotographic plate which is simple and inexpensive to manufacture.

It is still another further object of this invention to provide an electrophotographic plate wherein the photoconductive material adheres strongly to the underlying substrate over a period of time and with prolonged use.

It is yet another further object of this invention to provide an improved electrographic imaging process.

The foregoing objects and others are accomplished in accordance with this invention by the preparation and use of the chalcogen organic compounds more specifically described below.

In accordance with this invention, there are provided novel chalcogen organic compounds represented by the formula:

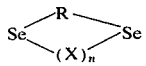   I.

wherein R is selected from divalent hydrocarbylene radicals of from 5 to 50 carbom atoms, divalent heterocyclic, alicyclic and aromatic radicals having from 3 to 50 carbon atoms, n is a positive integer and X is the radical —Se—R—Se—; linear polymers comprising recurring units represented by the formula:

II.

wherein A is selected from the group consisting of divalent alkylene radicals having at from 9 to 20 carbon atoms, divalent aromatic radicals having from 6 to 50 carbon atoms and divalent heterocyclic radicals.

Compounds of Formulae I and II can be prepared by reacting a difunctional molecule as described below in which both reactive sites are capable of forming a covalent bond with a difunctional reagent containing a diselenide — Se — Se — group. Diselenide precursors can be employed such as bis-(selenosulfate), bis-(selenocyanate), a bis(selenol) or a bis-(selenolester). The application of heat to compounds of Formula I generally produces by self condensation, polymers of Formula II. While some polymer formation occurs at relatively low temperatures of about 20°C, any temperature up to the thermal breakdown temperature of the reactants can be employed. Generally, heating to a temperature of from about 100° to about 300°C provides adequate yield of polymer while temperatures in the range from about 140° to about 230°C are preferred. The cyclic compounds can be recovered from the reaction mixtures by well known polymer/monomer equilibration techniques which involves treatment of the reaction mixture with a suitable solvent which precipitates only the cyclic compounds and favors cyclic formation.

Selenium and other photoconductors adhere to films made from compounds of Formulae I and II and such films adhere to most metal surfaces employed in electrophotographic plates. In addition, films comprising compounds of Formulae I and II are resilient and withstand abrasion which properties renders the films useful as coatings over as well as under the photoconductive selenium layer of an electrophotographic plate. Thus, plates can be prepared wherein the selenium photoconductor is sandwiched between two films comprising a compound or a mixture of compounds of this invention.

Many of the compounds of Formulae I and II are photoconductive. That is, the electrical conductivity of the material is modified by the presence of light. Accordingly, the photoconductive materials can be employed in electrophotographic plates useful in the electrophotographic process. The preferred photoconductive materials are those wherein the diselenide groups are attached to a carbon atom of an aromatic ring such as benzene, naphthalene or anthracene.

DETAILED DESCRIPTION OF THE INVENTION

In general, the cyclic and linear diselenide polymers of this invention are prepared by the reaction of a difunctional diselenide reactant with a difunctional organic compound. Typical examples of difunctional diselenide reactants are elemental selenium in strong aqueous alkali as described by H. Rheinboldt in "Houben-Weyl, Methoden der Organischen Chemie", Thieme Verlag, 1955 which is incorporated herein by reference; alkali metal diselenides prepared by reacting selenium with metallic alkali-metal in liquid ammonia as described in Rec. trav. Chim, des pays-Bas 81, 583 (1962) and the same publication at 83, 208 (1964) all of which is incorporated herein by reference and preferably bis(methoxy magnesium) diselenide prepared by the reaction of metallic magnesium and selenium in methanol. The preparation of bis(methoxy magnesium) diselenide is described in the Journal of Organic Chemistry 32, (1967) pp. 3929–3931 which is incorporated herein by reference.

The above mentioned difunctional diselenide reactants can be employed to produce compounds of this invention when reacted with difunctional organic compounds represented by the formula:

III.

wherein D is selected from the group consisting of divalent hydrocarbylene, and divalent heterocyclic radicals, each Y is independently selected from displaceable leaving groups such as halides, epoxy and sulfonate ester groups and diazonium halides including chloro, bromo, iodo and fluoro halide groups.

The organic groups D of Formula III are the organic groups in compounds of this invention and can comprise a wide variety of organic divalent groups. Thus, the organic groups can be radicals such as alkylene radicals having from 1 to 50 carbon atoms, substituted alkylene radicals wherein the substituents are selected from the halogens, hydroxy, alkoxy, alkoxycarbonyl, cyano and aryl groups. The organic groups can also be aryl radicals having from 6 to 50 carbon atoms derived from such parent hydrocarbons as benzene, naphthalene anthracene, tetracene, pentacene, phenanthrene, benz[a]anthracene, benzo[a]tetracene, benzo[a]pentacene, triphenylene, dibenz[a,c]-anthracene, dibenzo[a,c]tetracene, dibenzo[a,c]pentacene, chrysene, trans-stilbene, dibenz[a,h]anthracene, dibenzo[a,j]tetracene, dibenzo[a,l]pentacene, benzo[a]phenanthrene, dibenz[a,j]anthracene, picene, pentaphene, perylene, benzo[ghi]perylene, coronene, biphenyl, m-terphenyl, diphenylene, o-terphenyl, benzo[g]chrysene, tribenz[a,c,j]anthracene, dibenzo[g,p]chrysene, benzo[c]chrysene, benzo[a]tetraphene hexaphene, benzo[c]pentaphene, dibenzo[c,m]pentaphene, naphtho[2,3-c]pentaphene, benzo[a]perylene, dibenzo[a,j]perylene dibenzo[a,n]perylene, dibenzo[b,pqr]-perylene, tribenzo[b,k,pqr]perylene, dibenzo[b,k]-perylene, benzo[tuv]bisanthene, benzo[j]terrylene, pyrene, benzo[c]pyrene, benzo[a]pyrene, dibenzo[b,e]-pyrene, dibenzo[a,e]pyrene, dibenzo[e,l]pyrene, dibenzo[a,h]pyrene, dibenzo]a,i]pyrene, naphtho[2,3-e]elpyrene, naphtho[2,3-a]pyrene, dinaphtho[2,3-a:2', 3'-h]pyrene, dinaphtho[2,3-a:2', 3'-i]pyrene, tribenzo[a,e,i]pyrene, peropyrene, dibenzo[e,p]peropyrene, anthanthrene, dibenz[a,j]anthanthrene, dibenz[a,k]anthanthrene, azulene, p-terphenyl, fluorene, acenaphthylene, acenaphthene, benzo[c]tetraphene, toluene, m-xylene, mesitylene, durene, pentamethylbenzene, hexamethylbenzene benzo[ghi]perylene, tribenzo[a,e,i]pyrene, fluoranthene, benzo[b]fluorene, benzo[c]fluorene, benzylidenefluorene, benzo[ghi]fluoranthene, benzo[b]fluoranthene, benzo[k]fluoranthene, robicene and rubrene. Other organic groups include alkyl substituted aryl radicals having from 7 to 50 carbon atoms, cycloalkyl radicals, alkenyl radicals, alkynyl radicals, cycloalkenyl radicals, cycloalkyl alky radicals, cycloalkenyl and alkyl radicals.

The organic portion of the compound of this invention can also include heterocyclic radicals derived from such parent compounds as furans, pyridines, thiophenes, benzothiazoles, imidazolines and triazines. The hetero atom can be selected from oxygen, nitrogen and sulfur. Also heterocyclic divalent radicals can be the organic portion of the compounds of this invention derived from radicals such as thienyl, benzothienyl, naphthotienyl, selenophenyl, benzoselenophenyl, naphthosenenophenyl, thianthrenyl, selenanthrenyl, furyl, pyranyl, isobenzofuranyl, chromenyl, xanthenyl, selenoxanthenyl, phenoxathiinyl, pyrrolyl, imidazolyl, pyrazolyl, pyridyl, pyrazinyl, pyrimidinyl, pyridazinyl, indolizinyl, isoindolyl, indolyl, indazolyl, pyrinyl, quinolizinyl, isoquinolyl, quinolyl, phthalazinyl, naphthyridinyl, quinoxalinyl, quinazolinyl, cinnolinyl, pteridinyl, carbazolyl, carbolinyl, phenanthridinyl, acrydinyl, perimidinyl, phenanthrolinyl, phenazinyl, phenariazinyl, thiazolyl, selenazolyl, phenothiazinyl, phenoselenazinyl, phenoxazinyl, triazolyl and other heterocyclic radicals.

Typical examples of compounds of Formula IV are m-dichlorobenzene, p-dichlorobenzene, m-dibromobenzene, m-difluorobenzene, dichloromethane, dibromoethane, and 1,4-dichlorobutane, 1,4 -dichloropentane; 1,5-dichloropentane; 1,7-dichloro (or bromo-) heptane, 2,2'-bis(chloromethyl) oxetane; alpha, alpha'-dibromo-m-xylene; alpha, alpha'-dibromo-p-xylene; 1,2-epoxy-3-chloropropane; dibromonaphthalene; diiodonapthalene, butane-1,4-bis(toluenesulfonate); dibromoanthracene; 9,10-bis(chloromethylanthracene; diiodobenzene and its analogs, benzene bis-diazonium halides, dibromocarbazole; dibromopyrene; nitro dibromobenzene; 4,4'-dibromophenyl-sulfone, tribromophenol, 2,4,6-trichlorotrizine; and dibromopyridine.

Hydrocarbylene as used in this case is derived from the term "hydrocarbyl" and signifies the radical obtained by the loss of two hydrogen atoms from any hydrocarbon. As is well known in the art, hydrocarbyl is defined as the radical obtained by the loss of a hydrogen atom from any hydrocarbon. See, for example, "An Outline of Organic Chemistry" by Degering, 5th Edition (1947) at page 135. The hydrocarbylene, hydrocarbyleneoxy, halolydrocarbylene, radicals can have from 1 to 50, preferably 6 to 20 carbon atoms. The hydrocarbylene, hydrocarbylenoxy and hydrocarbylylenethio radicals and such radicals carrying halogen substituents, including fluorine-, bromine-, chlorine- and iodine- substituted radicals having reactive group Y include aliphatic and aromatic radicals which may contain olefinic or acetylenic unsaturation.

Another method of preparing compounds of Formulae I and II is the reaction of diselenium dihalide by electrophilic substitution on suitable aromatic compounds and by adding to double or triple bonds of unsaturated aliphatic compounds.

Diselenide polymers of this invention may also be prepared conveniently by employing selenium containing organic compounds previously employed as coupling reactants to prepare organic diselenide monomers by self condensation. Such coupling compounds can be employed with the difunctional organic compounds of Formulae III above to provide polymers of this invention. Typical examples of such selenium-containing organic compounds are selenols of the formula (1) R—Se—H; selenyl halides of the formula (2) R—Se—Hal wherein Hal represents a halide; selenenic acids of the formula (3) R—Se—OH; seleninic acids of the formula (4) R—Se—O$_2$H; neutral acid or alkaline hydrolysis products of alkyl selenosulfates of the formula (5) R—Se—SO$_3$H; the alkaline hydrolysis product of the selenocycanates of the formula (6) R—Se—CN wherein R is a hydrocarbon radical or substituted hydrocarbon radical in all of formulae (1) to (6) above.

Typical examples of compounds of Formula I are alpha, alpha'-diseleno-m-xylene dimer; alpha, alpha'-diseleno-p-xylene dimer; 1,3-diseleno phenylene dimer, 1,4-diselenophenylene dimer; 1,4-diselenonaphthalene dimer and its other isomers; 1,3-diseleno-pyrene dimer and related isomers; 1,5-diselenopentane dimer; 2,6-diselenopyridine dimer; and 9,10-diselenoanthracene dimer.

Further examples include cyclic diselenide monomers bearing a single diselenide function only. In Formula I these species would be represented by n=0. Typical examples include 1,2-diselenacyclohexane; 1,2-diselenanaphthalene; and 2,3-diseleno-1,4-dihydronaphthalene.

Typical examples of compounds of Formula II include the linear polymeric counterpart of the cyclic compounds named above.

To prepare compounds of Formula I above, the reactants are combined in a suitable reaction vessel. The cyclic compounds are first formed and can be isolated by treating the reaction mixture with a solvent at a suitable temperature which precipitates the cyclic compounds. Such solvents include methylene chloride, diethyl ether, benzene petroleum ether, ligroin, tetrachloroethane, chloroform, toluene, xylene chlorobenzene, chloronaphthalene, tetrahydrofuran, dioxane, 1,2-dimethoxyethane, carbon disulfide, ethyl acetate, lower aliphatic alcohols such as methanol, ethanol and propanol and mixtures of such typical solvents.

The temperature at which the cyclic compounds are recovered varies greatly depending upon the nature of the organic portion of the compound. Normally, relatively low temperatures such as from about 30° to about 80°C are employed although in some instances the cyclic compound can be recovered at higher temperatures.

The reaction producing compounds of Formulae I and II can conveniently take place in a reaction medium which is a solvent for at least one of the reactants. For example, lower alkanols can be employed when the bis(methoxy-magnesium)diselenides are employed. Other reaction media are water for reactions involving the water-soluble potassium selenosulfate or potassium selenocyanate; aliphatic alcohols or lower aliphatic ketones for potassium selenocyanate; liquid ammonia for sodium selenide; dimethyl formamide for alkyl diselenides; variously buffered aqueous solutions for displacement reactions or aromatic diazonium halides. In general, one attempts to select a solvent that is economical, easily removed from the reaction products and does not adversely affect either reaction component.

In general, the cyclic compounds of Formula I can be employed as an intermediate to produce the linear diselenide polymers of Formula II. Thus, in most instances, heating the cyclic compound produces the linear polymeric diselenides. The linear polymers can be produced directly and simultaneously with the cyclic compounds and as the reaction temperature is increased, the product is predominantly linear. For example, at temperatures above the melting point of the cyclic product the linear polymers are frequently produced. Generally, the linear polymers are produced at temperatures above about 90°C depending upon the nature of the organic portion of the molecule. For instance, the m-xylene containing linear polymer is produced in good yield above about 150°C which is the melting point of the cyclic polymer.

The diselenide polymers of this invention vary greatly in the number of repeating units and thus in molecular weight. The repeating units in the molecule can range from 3 to several thousand depending upon the amounts of the starting materials employed in the production of the polymer. Due to their general insolubility, the number of repeating units in the higher molecular weight polymers are not readily determinable.

The novel electrophotographic plates of the present invention are preferably prepared by providing a precleaned conductive substrate and depositing a coating comprising the diselenide polymers on said substrate. The substrate can be coated by methods such as melt coating and upon cooling and depositing one or more layers of photoconductive insulating materials over the interlayer.

The conductive substrate may comprise any suitable material having the capability of acting as a ground plane for the electrophotographic plate. Typical conductive materials include metals such as: aluminum, brass, stainless steel, copper, nickel and zinc; conductively coated glass such as: tin oxide, indium oxide and aluminum coated glass; similarly coatings on plastic substrates; or paper rendered conductive by the inclusion of a suitable chemical therein or conditioning in a humid atmosphere to assure the presence therein of a sufficient amount of water to render the material conductive. While materials having electrical resistivities of about $10^{10}$ ohm centimers are generally satisfactory for the supporting substrate of the electrophotographic plate of this invention, it is preferable to employ materials having an electrical resistivity of less than $10^5$ ohm centimers.

Prior to coating the conductive substrate with the interlayer, the substrate is cleaned of impurities which will adversely affect the mechanical or electrical properties of the electrophotographic plate. Primarily, the cleaning operation is conducted to remove grease, dirt and any other contaminates which might prevent firm adherence of the interfacial layer to the conductive substrate. Additionally, effective cleaning leaves the electrical properties of the conductive substrate uniform throughout its entire surface area. Conventional cleaning and degreasing methods are employed. As, for example, brass substrates may be cleaned in boiling trichloroethylene, etching the degreased substrate in 30 percent hydrogen peroxide for a few minutes, rinsing in deionized water and subsequently vacuum drying the conductive material. Other methods of cleaning brass and other conductive substrates are known to those skilled in the art and may be employed to prepare conductive substrates for use in the electrophotographic plates of this invention.

After the conductive substrate is cleaned to provide a suitable surface for the bonding of subsequent materials, the adhesive interlayer material of this invention is coated thereon. The polymers of this invention may be employed as an interlayer in any suitable thickness. A film with the thickness in a range of about 0.1 micron to about 5 microns is preferred since layers within this range exhibit bonding ability between the conductive substrates and the photoconductive insulating material while maintaining or improving the electrical properties of the electrophotographic plate. The optimum thickness of the interlayer is in the range of from about 0.1 microns to about 2.0 microns, since at this range the best overall combination of electrical and physical properties is found to exist.

Any convenient method may be employed for depositing the polymers of this invention upon the conductive substrate. One method for applying this interlayer, in accordance with the present invention, is by providing a solution of the desired polymer in a tank and lowering the conductive substrate into the tank so that the area to be coated lies below the surface of the polymer solution, withdrawing this coated substrate at a positive rate and allowing at least a portion of the solvent to be removed from the coating. The coating may be applied in several other ways as by spraying or through the use of a dip roll. By employing the solvent coating technique, the thickness of the interlayer may more easily be controlled by controlling the concentration of the polymer in the solvent. Solutions having the concentration on the order of from about 1 percent to 10 percent by weight of the polymer are preferred because sufficient material can be deposited from the solutions while the thickness of the deposited layer can be controlled within reasonable limits. Typical solvents which can be employed are xylene, toluene and preferably tetrachloroethane.

While the method of coating the conductive substrate with compounds of Formula I above is preferably the solvent coating technique, the linear polymers may be coated by means of melt coating techniques. Thus, the linear polymer is heated to a temperature above its melting point and a controlled amount of the melt is applied to the conductive substrate. Upon cooling the conductive substrate, the polymer solidifies forming a transparent coating on the substrate.

After the interlayer has been applied, the coated conductive substrate is coated with at least one layer of a photoconductive insulating material. While any suitable photoconductive material may be used in this invention, it is preferable that a selenium-containing layer be employed since selenium is the photoconductive material used most extensively in present commercial electrophotographic techniques and the diselenide polymers are particularly compatible with them.

The photoconductive insulating layer may comprise selenium or any suitable photoconductor or mixture of other materials with selenium. Typical selenium alloys or seleniumcontaining mixtures include: cadmium selenide, cadmium sulfoselenide, mixtures of sulfur and selenium such as are described by Carlson in U.S. Pat. No. 2,297,691; mixtures of arsenic and selenium such as are described by Mayer et al in U.S. Pat. No. 2,822,303; mixtures of selenium and tellurium as described by Paris in U.S. Pat. No. 2,803,541; arsenic selenide, tellurium selenide and mixtures thereof. It is preferred that a mixture of arsenic and selenium be employed in order that it may be heated without crystallizing. The photoconductive insulating layer may include various sensitizing additives such as the halogen dopants described in copending application Ser. No. 516,529 filed Dec. 27, 1965. Linear polymeric polyselenides of this invention preferably those containing in excess of 20 selenium atoms in the repeating units of the polymer can also be employed. Although the selenium employed in the photoconductive layer of the electrophotographic plates should be free of impurities which adversely affect its ability to hold electrostatic charges, this requirement is not necessary in the production of compounds of this invention. That is, commercially available selenium without further purification may be employed as a reactant to provide the diselenide and polyselenide polymers of this invention. However, if impurities are present in elemental selenium employed as the photoconductor of the electrophotographic plate, conducting paths may be formed in the film or said impurities may promote formation of conducting trigonal or crystalline selenium with the result that electrostatic charges leak off rapidly. In such instances, the electrostatic deposition of powder or toner cannot be obtained. Procedures employed to purify selenium for use as the photoconductive element of electrophotographic plates are well known in the art and should be employed in the production of electrophotographic plates containing the interlayer of this invention.

While the nature of the selenium photoconductive insulating layer of an electrophotographic plate has been described as vitreous, the exact molecular structure is not known. The term as used herein is descriptive of the physical appearance of the selenium. It is believed that the selenium is present substantially in an amorphous form containing minor proportions, if any, of a crystalline form of selenium although it is not desired to restrict this invention to the presence of such a mixture of forms. It is, therefore, to be understood that the various crystalline or amorphous structures included in the vitreous appearing form of selenium are likewise to be included in the term vitreous as used herein and in the claims.

The teachings of the present invention may be used to improve the bond of any of the photoconductive insulator layers to the supporting conductive substrate of any of the electrophotographic plates known to those skilled in the art. For example, such plates are described as to preparation, composition, thickness and other parameters, in U.S. Pat. No. 2,745,327 to Mengali; U.S. Pat. No. 2,803,541 to Paris; U.S. Pat. No. 2,803,542 to Ullrich, Jr.; U.S. Pat. No. 2,863,768 to Schaffert; U.S. Pat. No. 2,901,348 to Dessauer et al; U.S. Pat. No. 2,901,349 to Clark etc., which are incorporated herein by reference. The teachings of the aforementioned patents as well as the many other patents relating to the layered structure of electrophotographic plates, are applicable to the production of new and improved plates wherein the photoconductive insulator layers are bonded to the supporting substrate in accordance with the teachings of the present invention.

Any suitable method can be used for depositing the vitreous selenium upon the interfacial layer. Many suitable processes are described in the aforementioned patents as well as in the patents to Mengali et al, U.S. Pat. Nos. 2,657,152; to Bixby et al, 2,753,278; to Bixby, 2,970,906, etc. In general, the photoconductive insulating layer is deposited through vacuum evaporation of selenium onto a backing plate held at a temperature of at least about 20°C, and generally in the range between about 40°C and about 90°C and preferably, on the order of about 50°C. The deposition of the selenium layer is halted when the layer has reached the desired thickness such as, for example, in the order of about 10 to about 200 microns, preferably about 20 to about 60 microns. Deposition is conducted under pressure conditions on the order of less than about 1 micron of mercury.

Specifically, the plate temperature is maintained at a level whereby vitreous selenium is deposited during the deposition process. Thus, temperatures on the order of about 100°C may be used, provided the time of deposition is relatively short; whereas lower temperatures are more commonly used with longer periods of deposition. The selenium is held in a temperature controlled container which is maintained at a temperature about the melting point of selenium and at a point where its vapor pressure is sufficient to provide substantial deposition on the conductive backing. Deposition rates of about 100 or more microns per hour are obtainable but it is contemplated that under appropriate conditions higher rates of deposition can also be obtained.

In another embodiment, electrophotographic plates can be constructed wherein the photoconductive insulating layer comprises a dispersion of particles of organic or inorganic photoconductors in a binder. The binder in such a layer can comprise the cyclic or linear diselenide polymers or polyselenide polymers of this invention. When employed in conjunction with undercoatings of this invention, very stable, flexible electrophotographic plates are produced. The photoconductive and electrically insulating diselenides and polyselenides disclosed herein can be employed as binder material in place of those conventionally employed. Normally, the photoconductor is present in the binder in the range of up to about 85 percent by volume although higher amounts can be employed. In the usual binder plate, the photoconductor comprises about 50 percent or more, by volume, of the photoconductive layer. Typical inorganic photoconductors which can be dispersed in the binder of this invention include selenium, alloys of selenium as, for example, with arsenic or tellurium, compounds of selenium, zinc oxide, cadmium sulfide or the like. Organic photoconductors can be employed in the binder materials of this invention. Normally, organic photoconductors are dispersed in the binder materials of this invention in the range of up to about 85% by volume although, as with inorganic photoconductors, higher concentrations can be employed. Typical organic photoconductors are phthalocyanine pigments such as the X-form of metal free phthalocyanine described in U.S. Pat. No. 3,357,989 to Bryne et al, metal phthalocyanines, such as copper phthalocyanine, quinacridones available from duPont under the tradename Monastral Red, Monastral Violet and Monastral Red Y; substituted 2,4-diamino-triazines disclosed by Weinberger in U.S. Pat. No. 3,445,227; triphenodioxazines disclosed by Weinberger in U.S. Pat. No. 3,442,781; polynuclear aromatic quinones available from Allied Chemical Corp. under the tradename Indofast Double Scarlet, Indofast Violet Lake B, Indofast Brilliant Scarlet and Indofast Orange. The above list of photoconductors should in no way be taken as limiting, but is merely illustrative of suitable materials. The size of the photoconductive particles is not critical, but particles in a size range of about 0.01 to 1.0 microns yield particularly satisfactory results.

The novel electrophotographic plates of this invention employing the polymers of this invention as the photoconductive element of the plate are conveniently prepared by melt coating the polymer on the plate. Upon cooling the plate, the photoconductive layer hardens into a homogeneous transparent reddish brown scratch resistant layer. The layer adheres well to the conductive substrate and generally does not require an interlayer. Due to its tough polymeric structure, the surface is scratch resistant and is found to withstand the normal abrasion occurring in the cleaning of the plate in the imaging process. Another method of producing electrophotographic plates employing polymers of this invention as the photoconductive elements, is to produce the polymer directly on the plate by fusing a mixture of selenium and a polymeric diselenide of this invention directly on the conductive substrate. An intimate mixture of elemental selenium and a diselenide polymer is spread over a clean electrically conductive plate. The plate is then heated until the mixture fuses into a homogeneous mass thus producing the oligoselenide. The reaction takes place and the layer is smoothed to the desired thickness by means of a blade, rod or air knife followed by cooling of the plate whereupon the oligoselenide polymer hardens to form the photoconductive element of the electrophotographic plate.

Also, in accordance with the present invention, an electrophotographic plate of improved properties is prepared by placing a photoconductive insulating coating on a suitable backing and further placing on the photoconductive insulating surface a thin coating of a protective film comprising a polymer represented by formula I. The product is, therefore, a structure comprising a conductive backing member, such as, for example, a metal plate, a photoconductive insulating layer thereon such as a vitreous selenium coating on the plate or a photoconductive polymer of this invention, and a protective coating or layer on the selenium or polymer comprising a polymer of this invention.

The thickness of the protective coating comprising a diselenide polymer of this invention is in the range of from about 0.1 micron to 25 microns and preferably in the range of from about 5 microns to about 10 microns. The protective coating is applied to the photoconductive element of the plate in several ways. The diselenide polymer can be dissolved in a suitable solvent and applied by conventional means and then removing the solvent as by evaporation. The diselenide polymer can also be coated over the photoconductive element by conventional melt coating techniques followed by cooling of the plate to solidify the molten polymer. An electrophotographic plate prepared according to the present invention satisfied the critical electrical requirements imposed by the xerographic art and it is outstanding in resistance to mechanical wear and damage.

Not only does the improved plate have increased abrasion resistance but, in addition, it operates more satisfactorily in the xerographic process under conditions of high humidity. It is frequently observed that conditions of high humidity lead to the formation of indistinct or weak images on the xerographic plate, apparently, at least partially because of a film that forms on the plate during such operations. It has been found that improved high humidity operations are achieved by the protected plates according to this invention.

A preferred electrophotographic plate of this invention is prepared by first coating a suitable substrate with a diselenide polymer of this invention to form an interlayer between the photoconductive insulating coating and the conductive substrate. An electrophotographic plate of this invention is prepared by placing the photoconductive insulating surface such as vitreous selenium over the interlayer and further placing on the photoconductive insulating surface a thin coating of a protective film of a diselenide polymer of this invention preferably from a solution of the polymer. The preferred product is, therefore, a structure comprising a substrate, an adhesive interlayer coated on the substrate, a photoconductive insulating layer coated over the interlayer and a protective coating or layer on the photoconductive insulator.

BRIEF DESCRIPTION OF THE DRAWINGS

The description of the drawing and said drawings are set forth in parent application Ser. No. 59,495, filed July 30, 1970 and now U.S. Pat. No. 3,671,467. Said drawings and description thereof describe the layered structure referred to above and are hereby incorporated by reference.

DESCRIPTION OF THE PREFERRED EMBODIMENTS

The following examples will further define various preferred embodiments of the present invention. Parts and percentages are by weight unless otherwise specified. These examples are not to be considered as a limitation upon the scope of the invention, but merely as being illustrative thereof.

EXAMPLE I

In a suitable reaction vessel, there is placed 15 grams of sodium sulfite and 8 grams of selenium together with about 75 ml. of water and 0.05 mole of 4,6-bis(-chloromethyl)-m-xylene. The mixture is diluted to about 200 ml. with water and heated to reflux temperature for a period of about 2 hours. A yellow precipitate is formed and 10 grams of sodium hydroxide in 50 ml. of water is added to the reaction vessel. The yellow reaction product is then removed and washed with water, crushed and dried over phosphorous pentoxide. Elemental analysis reveals the material to be poly 4,6-bis(-methyl)-m-xylene diselenide.

EXAMPLE II

In a suitable reaction vessel there is placed 15 grams of sodium sulfite, 8 grams of selenium and 10.8 grams of di(chloromethyl)mesitylene which mixture is diluted to a volume of about 200 ml. with water. The mixture is heated to reflux temperature and refluxed for 1.5 hours forming a yellow precipitate. Ten grams of sodium hydroxide in 50 ml. of water is added to the vessel and the mixture is heated to reflux temperature for an additional 30 minutes. The precipitate is removed, washed with water, dilute sodium hydroxide and three additional water washed at the boiling temperature and then dried over phosphorous pentoxide. The product is dissolved in benzene, filtered and precipitated in petroleum ether (20°–40°C boiling range) and then washed with 500 ml. of petroleum ether. The dried product has an elemental analysis which indicates it to be poly(dimethylmesitylene diselenide).

EXAMPLE III

About 1 mol., 79 parts, of elemental selenium is dissolved in about 200 parts of potassium sulfite and about 200 parts of deionized water by stirring the mixture at a temperature of from about 60° to about 80°C. The remaining dark insoluble material is removed by filtration providing a pale yellow filtrate which is diluted with deoxygenated water to about 2 liters. A solution containing about 120 parts of alpha, alpha'-dibromo-meta-xylene in hot ethanol, about 1 liter of 95 percent strength, is added to the filtrate. The mixture is heated and stirred at 60°C for 2 hours after which 1 mol. of potassium hydroxide in 250 parts of water is added to the solution producing the formation of a heavy plastic precipitate. The supernatant liquid is decanted from the precipitate after allowing 1 hour for the precipitate to settle. The decanted liquid is aerated and yields another crop of precipitate. Both precipitates are combined and broken up in the presence of cold water. After several water washes, there is provided a bright yellow granular powder. The powder is dissolved in 1,1,2,2-tetrachloroethane at 100°C. The solution is cooled slowly to precipitate a crystalline product having a melting range of 136°–138°C and an elemental analysis indicating it to be alpha, alpha' diseleno-meta-xylene, a cyclic dimer. Upon heating the dimer above the melting range and quenching to room temperature, a product having a Tg in the range of 20°–35°C is obtained. The elemental composition remains unchanged and is found to be as follows: Carbon - 36.6%, hydrogen 3.07% and selenium 60.41, which compares to the calculated values for $(C_8H_8Se_2)_n$ of carbon 36.67, hydrogen 3.08 and selenium 60.25.

EXAMPLE IV

About 1 mol., 79 parts, of elemental selenium is dissolved in about 200 parts of potassium sulfite and about 200 parts of deionized water by stirring the mixture at a temperature of from about 60° to about 80°C. The remaining dark insoluble material is removed by filtration providing a pale yellow filtrate which is diluted with deoxygenated water to about 2 liters. A solution containing about 120 parts of alpha, alpha'-dibromo-para-xylene in hot ethanol, about 1 liter of 95 percent strength, is added to the filtrate. The mixture is heated and stirred at 60°C for 2 hours after which 1 mol. of potassium hydroxide in 250 parts of water is added to the solution producing the formation of a heavy plastic precipitate. The supernatant liquid is decanted from the precipitate after allowing one hour for the precipitate to settle. The decanted liquid is aerated and yields another crop of precipitate. Both precipitates are combined and broken up in the presence of cold water. After several water washes, there is provided a bright yellow granular powder which by elemental analysis is shown to be polymeric alpha, alpha' diseleno-para-xylene.

EXAMPLE V

About 0.25 mole of m-dibromobenzene is dissolved in 150 ml. of dry tetrahydrofuran and is added slowly to a mixture of 0.55 mole of magnesium in 100 ml. of dry tetrahydrofuran at 40°C. The reaction mixture is maintained at 40°C for an additional hour after which 0.5 mole of selenium powder is added. This mixture is dumped over ice and solidified to a pH of from 1 to 2 with concentrate hydrochloric acid. A stream of air is blown through the mixture for several hours and a solid is formed. The solid is removed from the mixture by filtration and triturated several times with boiling ethanol to yield a thick orange oil. The oil is reprecipitated in 1,1,2,2-tetra chloroethane/petroleum ether mixture and carefully dried to yield a reddish-orange glass which melts at 90°–93°C and shows a glass transition temperature (Tg) at a temperature of 62°–64°C after melting. The product is subjected to elemental analysis indicating the product to be poly(meta-phenylene diselenide) having bromine end groups. The results of the analysis appear below.

Calculated ($C_{126}H_{84}Br_2Se_{40}$) carbon 30.80%; hydrogen 1.72%; bromine 3.26%; selenium 64.20%.

Found: carbon 31.89%; hydrogen 2.04%; bromine 3.52%; selenium 62.23%.

EXAMPLE VI

The procedure of Example VI is repeated with the exception that p-dibromobenzene is employed in place of m-dibromobenzene. The product is subjected to elemental analysis indicating the product to be a p-phenylenediselenide polymer containing approximately 34 repeating diselenide units. The results of the analysis appears below.

Calculated: ($C_{216}H_{144}Br_2Se_{70}$) carbon 32.30%; hydrogen 1.70%; selenium 65.0% and bromine 1.88%.

Found: Carbon 31.79%; hydrogen 1.73%; selenium 64.37% and bromine 1.98%.

EXAMPLE VII

The product of Example XI is melt coated on an aluminum substrate and smoothed by means of a glass rod to form a thin coating over the aluminum. After hardening the coating is electrostatically charged by means of a corona discharge device to 1,800 volts. Upon exposure to light, the coating photodischarged at the rate of 100 volts per second with a 200 volt residual charge with no significant fatiguing.

EXAMPLE VIII

Approximately 0.03 moles of 4,4'-bis-diazobenzene fluoroborate salt is suspended in about 75 ml. of water which is cooled to 0°C. Approximately 0.03 moles of potassium selenocyanate and 60 ml. of water is added dropwise. A precipitate is formed which upon recrystallization from ethanol yields yellow crystals melting at 156.5°–158.5°C. An elemental analysis shows the compound to be p-phenyldiselenocyanate. Approximately 0.028 moles of the purified material is dissolved in 75 ml. of isopropanol and a solution of potassium hydroxide pellets in isopropanol is added whereupon a yellow precipitate is formed. After recrystallization from 1,1,-2,2-tetrachloroethane/petroleum ether the precipitate is subjected to elemental anlysis indicating the composition to be that of p-phenylenediselenide polymer.

While specific components of the present system are defined in the working examples above, any of the other typical materials indicated above may be substituted in said working examples if appropriate. In addition, many other variables may be introduced in the present process, such as further purification steps or other reaction components which may in any way affect, enhance or otherwise improve the present process.

While various specifics are cited in the present application, many modifications and ramifications will occur to those skilled in the art upon a reading of the present disclosure. These are intended to be encompassed within the scope of this invention.

What is claimed is:

1. A cyclic compound represented by the formula:

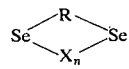

wherein R is selected from the group consisting of divalent hydrocarbylene and halohydrocarbylene radicals having from 5 to 50 carbon atoms and heterocyclic radicals having from 2 to 20 carbon atoms, n is 1 and X is the radical — Se — R — Se —.

2. A compound of claim 1 wherein R is an aromatic radical.

3. A compound of claim 2 wherein R is a xylylene radical.

4. A compound of claim 1 wherein R is an alkylene radical having from 5 to 18 carbon atoms.

5. A compound of claim 2 wherein R is phenylene radical.

6. A compound of claim 1 wherein n is an integer from 1 to 4.

7. A compound of claim 6 wherein n is 1.

8. A cyclic compound represented by the formula:

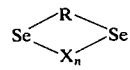

wherein R is a divalent hydrocarbylene radical having from 5 to 50 carbon atoms, $n$ is a positive integer and X is the radical — Se — R — Se —.

9. Cyclic alpha, alpha'-diseleno-meta-xylene dimer.
10. Cyclic alpha, alpha'-diseleno-para-xylene dimer.
11. Cyclic 1,3-diselenophenylene dimer.
12. Cyclic 1,4-diselenophenylene dimer.
13. Cyclic 1,4-diselenonaphthalene dimer.
14. Cyclic 9,10-diselenoanthracene dimer.
15. Cyclic 3,8-diseleno pyrene dimer.

* * * * *

UNITED STATES PATENT AND TRADEMARK OFFICE
CERTIFICATE OF CORRECTION

PATENT NO. : 3,905,958
DATED : September 16, 1975
INVENTOR(S) : Wolfgang H. H. Gunther It is certified that error appears in the above-identified patent and that said Letters Patent are hereby corrected as shown below:

Column 2, line 24, "seleniumcontaining" should read -- selenium containing --.

Claim 2, lines 1 and 2, "an aromatic radical" should read -- arylene --.

Signed and Sealed this twenty-fourth Day of February 1976

[SEAL]

Attest:

RUTH C. MASON
Attesting Officer

C. MARSHALL DANN
Commissioner of Patents and Trademarks